United States Patent
Yamazaki

(10) Patent No.: US 10,681,260 B2
(45) Date of Patent: Jun. 9, 2020

(54) FOCUS DETECTION DEVICE AND FOCUS DETECTION METHOD

(71) Applicant: Olympus Corporation, Hachioji-shi, Tokyo (JP)

(72) Inventor: Yukie Yamazaki, Tachikawa (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/275,231

(22) Filed: Feb. 13, 2019

(65) Prior Publication Data
US 2019/0281225 A1    Sep. 12, 2019

(30) Foreign Application Priority Data
Mar. 6, 2018    (JP) .................. 2018-039248

(51) Int. Cl.
*H04N 5/232*    (2006.01)
(52) U.S. Cl.
CPC .............................. *H04N 5/232122* (2018.08)
(58) Field of Classification Search
CPC .............................................. H04N 5/232122
See application file for complete search history.

(56) References Cited

U.S. PATENT DOCUMENTS

| 8,164,642 B2 | 4/2012 | Kusaka |
| 9,451,154 B2 | 9/2016 | Kusaka |
| 2017/0214864 A1* | 7/2017 | Izuha ............... H01L 27/14625 |
| 2019/0268542 A1* | 8/2019 | Yamazaki ........ H04N 5/232127 |

* cited by examiner

*Primary Examiner* — Joel W Fosselman
(74) *Attorney, Agent, or Firm* — John C. Pokotylo; Pokotylo Patent Services

(57) ABSTRACT

A focus detection device, comprising an image sensor having pixel sections that subject light flux that has passed through a photographing lens to pupil division, and that are made up of pairs of pixels that respectively receive the light flux, and processors, wherein the one or more processors calculate degree of similarity between pixel signal rows that are positioned in a direction that is different to the pupil division direction, and are constituted by pixel signals of a plurality of pixels corresponding to at least one of the pairs, and if the degree of similarity is higher that a specified value, generate a spatial addition pixel signal by adding the pairs of pixel signals of the pixel signal row in a direction that is different to the pupil division direction, for each respective pair, and perform phase difference detection based on this spatial addition pixel signal that has been generated.

12 Claims, 9 Drawing Sheets

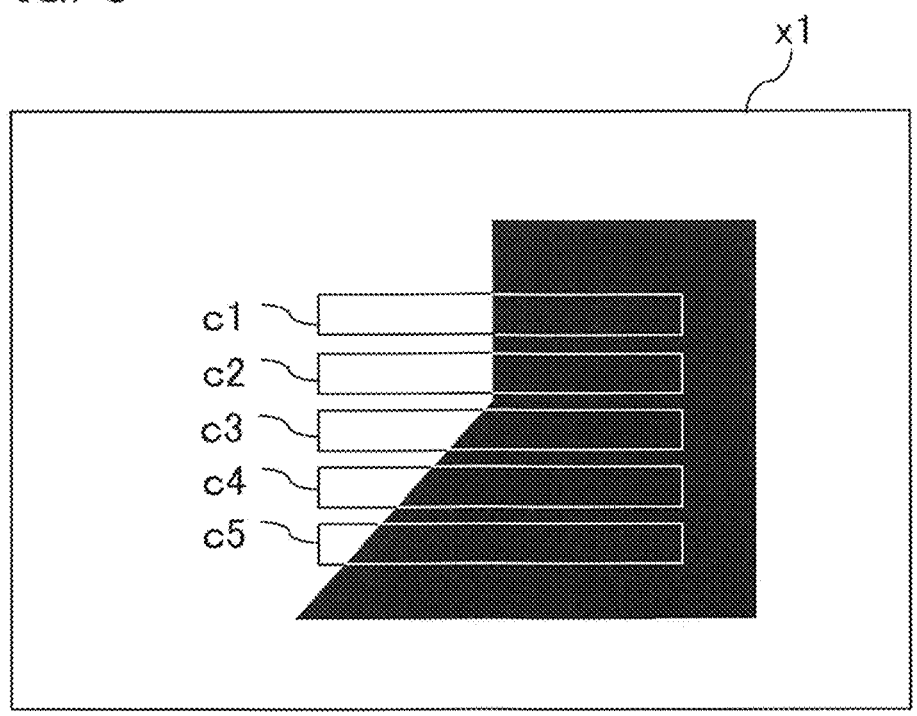

1

FOCUS DETECTION DEVICE AND FOCUS DETECTION METHOD

CROSS-REFERENCE TO RELATED APPLICATIONS

Benefit is claimed, under 35 U.S.C. § 119, to the filing date of prior Japanese Patent Application No. 2018-039248 filed on Mar. 6, 2018. This application is expressly incorporated herein by reference. The scope of the present invention is not limited to any requirements of the specific embodiments described in the application.

BACKGROUND OF THE INVENTION

1. Field of the Invention

The present invention relates to a focus detection device and focus detection method that perform focus detection using a phase difference AF (Auto Focus) method.

2. Description of the Related Art

In an imaging device such as a camera, moving a photographing lens to an in focus position is generally performed using phase difference AF. Specifically, a pair of focus detection pixel groups (phase difference detection pixel groups) receive subject light flux from different directions that are either side of the optical axis of the photographing lens, and generate pixel row data for every focus detection pixel group. Defocus amount of the photographing lens is then calculated by calculating a phase difference between this pair of pixel row data, and focus adjustment of the photographing lens is performed based on this defocus amount that has been calculated.

When calculating the phase difference from the pair of focus detection pixel row data, if the level of the pixel row data is low, a focus detection not possible state arises. A focus detection device has therefore been proposed that performs focus detection by adding pairs of pixel row data in time series to increase the level of the pixel row data (refer to Japanese patent laid open number 4867552 (hereafter referred to as "patent publication 1")). However, if time series addition is applied to a moving subject it is likely that errors will arise in focus detection results.

It has therefore been proposed to provide a spatial integration section and a time series integration section, and to perform focus detection based on either one of the pixel rows in accordance with conditions (refer, for example, to Japanese Patent No. 5942757 (hereafter referred to as "patent publication 2")). Specifically, first, addition is repeatedly performed until spatial integration data reaches a first specified threshold value. In a case where spatial integration data does not reach a first specified value, even if addition is performed up to a maximum integration range by the spatial integration section, spatial integration is performed by the spatial integration section by including the pixel rows of previous frames until a maximum is achieved. Addition is performed until data of the spatial integration by including previous frames in a chronological order reaches a second specified threshold value.

With the focus detection device disclosed in patent publication 2 described above, first pixel row data is spatially added, and then addition is repeated until this spatial integration value reaches a first specified threshold value. However, in a case of adding pixel data spatially (with vertical line detection, a vertical direction), the possibility of a subject pattern being different increases the further apart each set of focus detection pixel data are. In a case where associated focus detection pixel row data having different subject patterns have been added, ranging precision is deteriorated.

SUMMARY OF THE INVENTION

The present invention provides a focus detection device and focus detection method that prevent deterioration in ranging precision, even when there are different subject patterns.

A focus detection device of a first aspect of the present invention comprises an image sensor having a plurality of pixel sections that subject light flux from a subject that has passed through a photographing lens to pupil division, and that are made up of pairs of pixels that respectively receive the light flux that has been subjected to pupil division, and that outputs pairs of pixel signal rows corresponding to pupil division by photoelectric conversion of the plurality of pixel sections, and one or more processors constructed as hardware, wherein the one or more processors calculate degree of similarity between pixel signal rows that are positioned in a direction that is different to the pupil division direction, and that are composed of pixel signals of a plurality of pixels corresponding to at least one of the pairs, and if the degree of similarity is higher that a specified value, generate a spatial addition pixel signal by adding the pairs of pixel signals of the pixel signal row in a direction that is different to the pupil division direction, for each respective pair, and perform phase difference detection based on this spatial addition pixel signal that has been generated.

A focus detection method of a second aspect of the present invention, is a focus detection method for a imaging device that comprises an image sensor having a plurality of pixel sections that subject light flux from a subject that has passed through a photographing lens to pupil division and that are made up of pairs of pixels that respectively receive the light flux that has been subjected to pupil division, and that outputs pairs of pixel signal rows corresponding to pupil division by photoelectric conversion of the plurality of pixel sections, the focus detection method comprising calculating degree of similarity between pixel signal rows that are positioned in a direction that is different to the pupil division direction, composed of pixel signals of a plurality of pixels corresponding to at least one of the pairs, and if the degree of similarity is higher that a specified value, generating a spatial addition pixel signal by adding the pairs of pixel signals of the pixel signal row in a direction that is different to the pupil division direction, for each respective pair, and performing phase difference detection based on this spatial addition pixel signal that has been generated.

BRIEF DESCRIPTION OF THE DRAWINGS

FIG. 1A and FIG. 18 are drawings showing examples of patterns of a subject taken by a digital camera of one embodiment of the present invention.

FIG. 5 is a drawing showing another example of a pattern of a subject taken by a digital camera of one embodiment of the present invention.

DETAILED DESCRIPTION OF THE PREFERRED EMBODIMENTS

An example where a digital camera (hereafter abbreviated to camera) is adopted as one embodiment of the present invention will be described in the following. This camera has an imaging section, with a subject image being converted to image data by this imaging section, and the subject image being subjected to live view display on a display section arranged on the rear surface of the camera body based on this converted image data. A photographer determines composition and photo opportunity by looking at the live view display. At the time of a shooting operation (release operation), image data is stored in a storage medium. Image data that has been stored in the storage medium can be played back and displayed on the display section if playback mode is selected.

Figure 9:
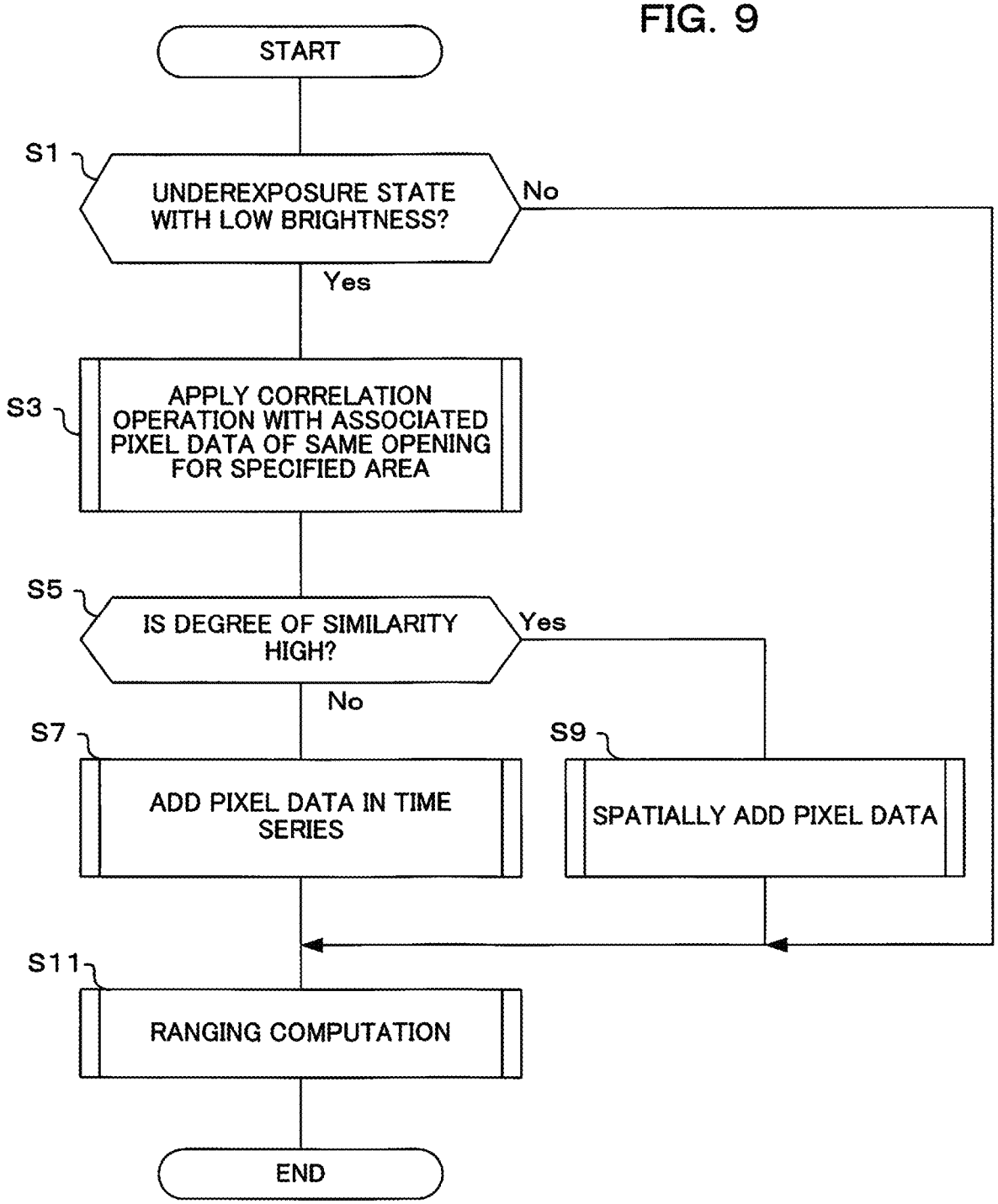
FIG. 9 is a flowchart showing AF operation of the camera of one embodiment of the present invention.

Also, with this embodiment the image sensor has focus detection pixels for phase difference detection, with a correlation operation being performed using associated pixels of the same opening, and whether or not there is similarity in a subject pattern being determined based on the results of this operation (refer, for example, to S3 and S5 in FIG. 9). If similarity is high, pixel data is spatially added (refer to S9 in FIG. 9, for example), while if similarity is low pixel data is added in time series (refer, for example, to S7 in FIG. 9). Ranging computation is performed using this pixel data that has been added.

Figure 1B:
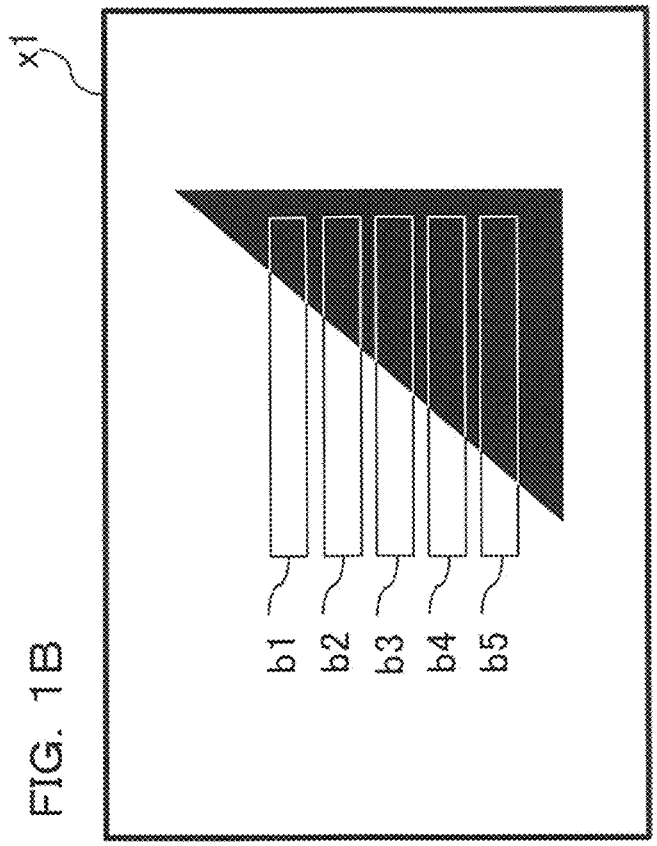
Figure 1A:
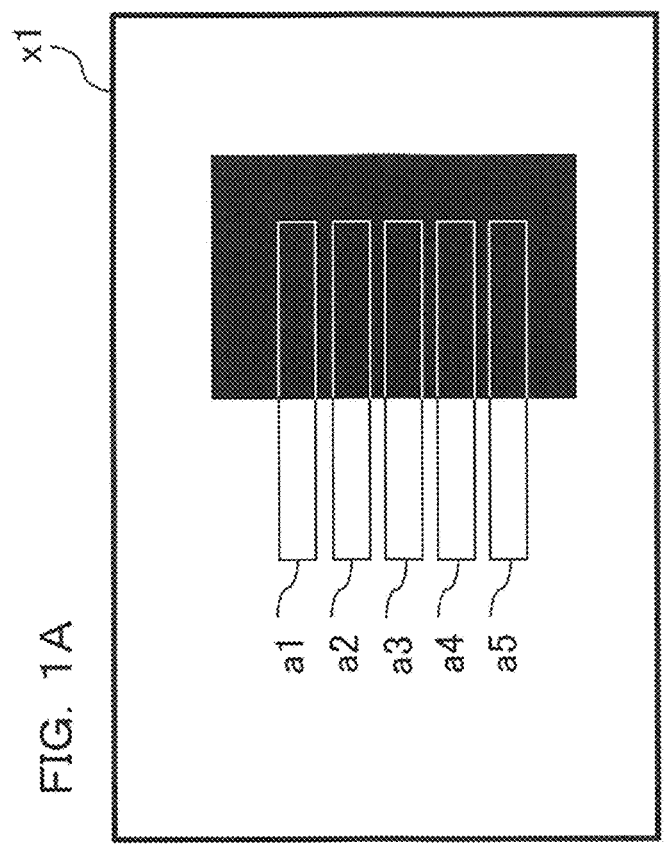

Before describing the structure of this embodiment, an overview of the focus detection of this embodiment will first be described. FIG. 1A and FIG. 1B show patterns of subject A and subject B that have been projected on to imaging surface x1 on the image sensor 21 (refer to FIG. 6), in this embodiment. FIG. 1A shows pattern of subject A, and has a black portion on the right side of imaging surface x1. Focus detection areas 1 to 5 extending in the horizontal direction (longitudinal direction on the imaging surface) are provided on imaging surface x1. In FIG. 1A, focus detection areas a1 to a5 are written, corresponding to subject A. With the pattern of this subject A, for each of the focus detection areas a1 to a5, pixel data of corresponding pixels above and below are substantially the same value.

Also, FIG. 1B shows pattern of subject B, and there is a triangular black portion in this pattern. In FIG. 1B, the focus detection areas of imaging surface x1 are written as focus detection areas b1 to b5, corresponding to subject B. With the pattern of this subject B, for each of the focus detection areas b1 to b5, pixel data of corresponding pixels above and below has different values. Specifically, the black portion of subject B is a triangular shape with a base at the lower right side of the screen and the top at the upper right side, as shown in FIG. 1B. As a result, in the vicinity of the hypotenuse of the black triangle, for each of the focus detection areas b1 to b5, pixel data of corresponding pixels above and below has different values.

In the case of focus detection using a normal phase difference AF method, in a correct exposure state a correlation operation for focus detection is executed for every focus detection area. However, in an underexposure state with low brightness, contrast (difference between maximum value and minimum value of focus detection pixel data, for example) within a single focus detection area does not become greater than or equal to a specified threshold value, and focus detection becomes impossible.

For subject A as shown in FIG. 1A, there may be cases where contrast becomes greater than or equal to a specified threshold value as a result of spatially adding focus detection pixel data for focus detection areas a1 to a5, and in this case focus detection is possible. When focus detection areas extend in the horizontal direction (direction of phase difference detection is the horizontal direction), as shown in FIG. 1A, for example, spatial addition of focus detection pixel data means addition of pixel data of focus detection pixels at corresponding positions in the vertical direction. In other words, spatial addition is called addition of focus detection pixel data that is arranged at corresponding positions in a direction that is different to the arrangement direction of pixels within the focus detection area (phase difference detection direction) (the vertical direction in FIG. 1A).

In the case of subject B, such as shown in FIG. 1B, there is a possibility that contrast will not reach the specified threshold value even if focus detection pixel data of focus detection areas b1 to b5 are spatially added. In this case either focus detection will remain impossible, or focus detection area will become large.

Figure 2:
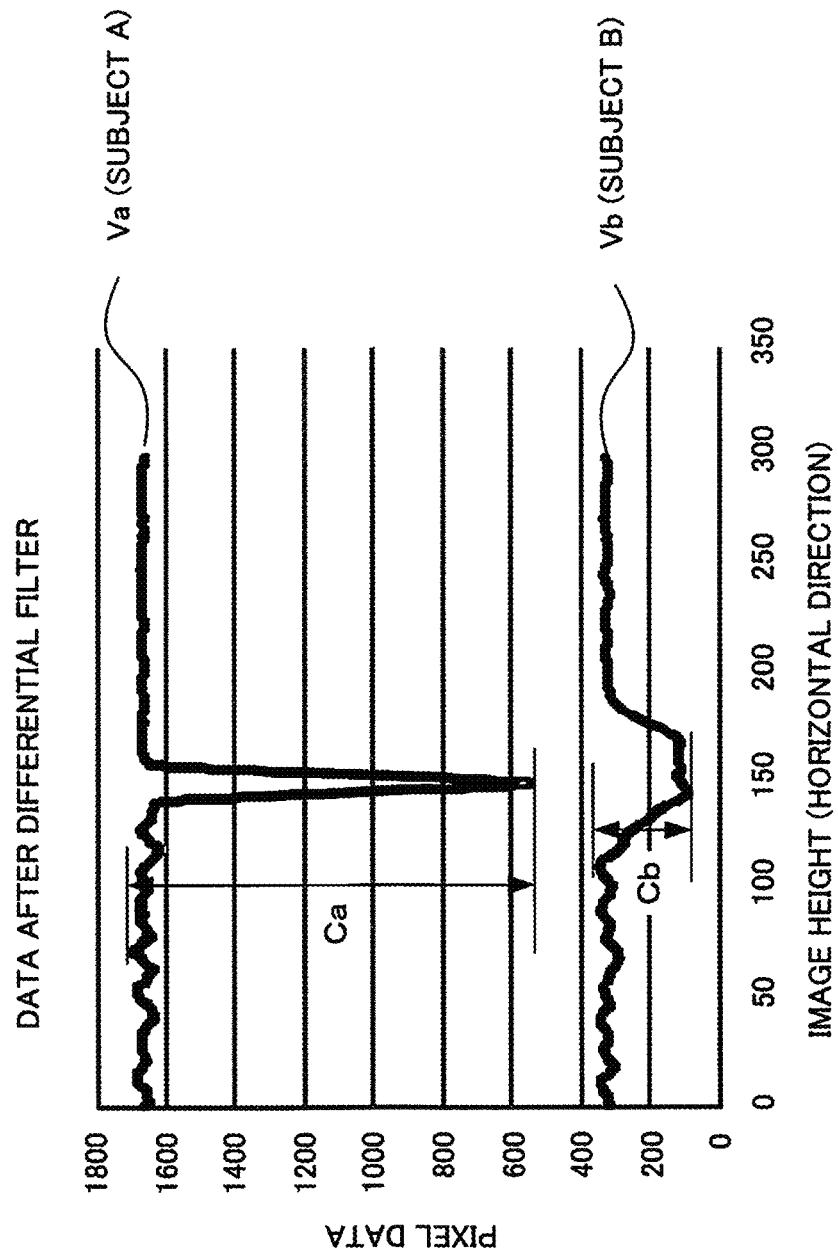
FIG. 2 is a graph showing image data after image processing using a differential filter has been applied to image data that has been acquired by an image sensor in the digital camera of one embodiment of the present invention.

This point will be described using FIG. 2. FIG. 2 shows respective spatial addition of focus detection pixel data of focus detection areas a1 to a5, and focus detection pixel data of focus detection areas b1 to b5, that were acquired by imaging subjects A and B of FIG. 1A and FIG. 1B, and also shows focus detection pixel data resulting from having applied differential processing using a differential filter. The horizontal axis of FIG. 2 shows horizontal direction (image height direction or horizontal direction) position of a focus detection area, and the vertical axis shows pixel data (pixel value) of focus detection pixels. Va represents focus detection pixel data of subject A, and Vb represents focus detection pixel data of subject B. Whereas contrast value of focus detection pixel data Va of subject A is Ca, contrast value of focus detection pixel data Vb of subject B is Cb. Specifically, in the case of a subject pattern such as shown in FIG. 1B, even if pixel data is added (spatial addition) in a direction that is orthogonal to the arrangement direction of pixels within a focus detection area, either focus detection is not possible with contrast value remaining small, or focus detection error becomes large In the case of a pattern such as for subject A, as stated above, there may be cases where it becomes possible to detect focused point by performing spatial addition. On the other hand, in the case of a pattern such as subject B, even if spatial addition is performed, either it is not possible to detect a focused point or focus detection error becomes large. Specifically, whether or not it is possible to improve focus detection as a result of spatial addition differs depending on a subject pattern. With this embodiment therefore, a correlation operation is executed using focus detection pixel data for the same opening among focus detection pixels to be added. Degree of similarity of focus detection pixel data rows corresponding to subject pattern are calculated based on results of this correlation operation, and it is determined whether or not to perform spatial addition based on the results of this calculation.

Figure 3:
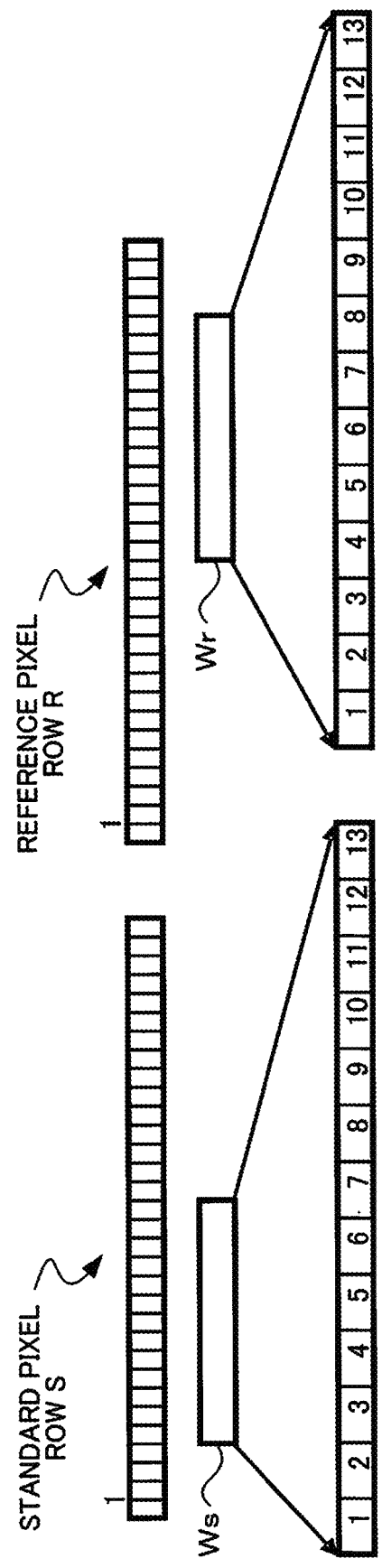
FIG. 3 is a drawing showing one example of a correlation operation in the digital camera of one embodiment of the present invention.

First, description will be given of a general correlation operation. FIG. 3 shows a target of correlation operation, in a case where focus detection is performed using a phase difference method. Regarding the focus detection pixels, there are focus detection pixels that receive subject light flux that is incident from one pupil, of a pair of pupils of the photographing lens 11 (refer to FIG. 6), and perform photoelectric conversion, and focus detection pixels that receive the subject light flux that is incident from another pupil of the photographing lens 11 and perform photoelectric conversion. Standard pixel row S is a pixel row that receives subject light from one of the pupils of the paired pupils, among the focus detection pixels. Also, reference pixel row R is a pixel row that receives subject light from the other one of the pupils of the paired pupils, among the focus detection pixels.

It should be noted that focus detection pixels of the same opening means focus detection pixels having the same opening, that is, focus detection pixels that receive subject light that is incident from the same one pupil, of the paired pupils. Pixels of standard pixel row S are all focus detection pixels of the same opening, as standard pixels, while pixels of reference pixel row R are all focus detection pixels of the same opening, as reference pixels. For example, left-side opening focus detection pixels and right-side opening focus detection pixels are focus detection pixels of the same opening. Also, upper opening focus detection pixels and lower opening focus detection pixels are also focus detection pixels of the same opening. Same opening data means pixel data of focus detection pixels corresponding to the same opening.

A correlation operation is correlation of focus detection pixel data for window Ws and window Wr respectively formed from the same number k of pixels, within the standard pixel row S and the reference pixel row R. With the example shown in FIG. 3, the size of the respective windows becomes number of pixels k=13. A difference between focus detection pixel data at corresponding positions within each window is calculated, and a degree of correlation (degree of similarity) F, which is a result of having accumulated differences for 13 pixels, which is the size of the window, is calculated based on equation (1) below.

$$F=\Sigma \text{abs}(Vs(i+k-1)-Vr(j+k-1)) \qquad (1)$$

Here, Vs (i) is $i^{th}$ pixel data of the standard pixel row S, while Vr(j) means $j^{th}$ pixel data of the reference pixel row R, and values of i and j can be set in accordance with conditions. Also, abs means calculating an absolute value. Also, $\Sigma$ means cumulative addition of absolute values that have been calculated in a range of from k=1 to k=13, which is the window size.

With focus detection using a general phase detection method, degree of correlation F is calculated based on equation (1) while shifting windows Ws and Wr of standard pixel row S and reference pixel row R by one pixel, and defocus amount of the photographing lens 11 is obtained based on shift amount for which this degree of correlation F that has been calculated becomes a minimum. However, with this embodiment, before performing focus detection using the general phase difference method, degree of similarity for a focus detection pixel data row is calculated by performing a correlation operation using focus detection pixel data of the same opening, and it is determined from the result of this calculation whether or not focus detection will be improved by spatial addition.

A correlation operation using focus detection pixel data of the same opening is performed as follows. As shown in FIG. 1A and FIG. 1B, with this embodiment five focus detection areas alto a5 (b1 to b5) are provided. Standard pixel rows (or reference pixel rows) of two of these focus detection areas, for example areas a1 and a2, are determined, and the previously described correlation operation is performed with associated pixel rows of these two areas. In this case, degree of correlation F is calculated using (2) below.

$$F=\Sigma \text{abs}(Vsa1(i+k-1)-Vsa2(j+k-1)) \qquad (2)$$

Here, Vsa1$(i)$ means $(i)^{th}$ pixel data of reference pixel row of focus detection area a1, and Vsa2$(j)$ means $(i)^{th}$ pixel data of reference pixel row of focus detection area a2. It should be noted that in the case of a subject such as shown in FIG. 1B, the suffix a for V may be replaced with b. In the case of replacing with areas other than focus detection area 1 and 2, the numeral suffixes may be replaced with numerals representing the other areas.

Figure 4A:
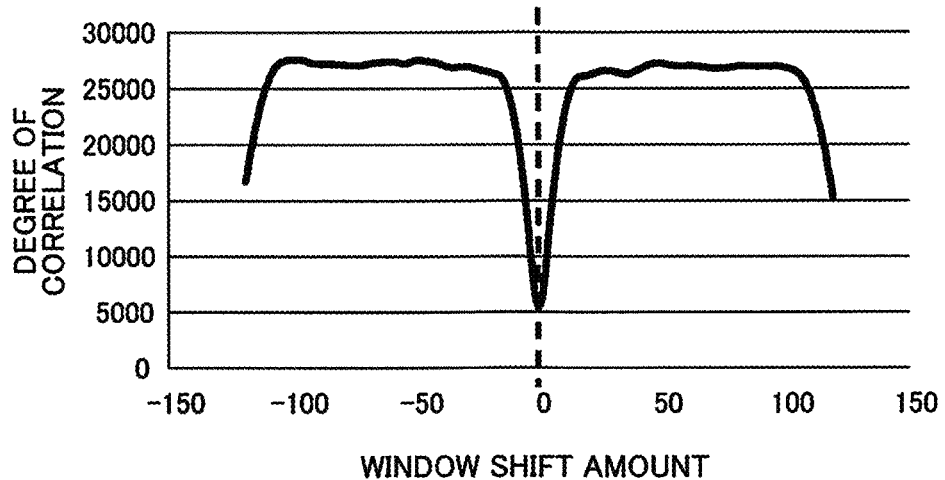
FIG. 4A and FIG. 4B are graphs showing that degree of correlation (degree of similarity) differs depending on difference in subject pattern, in the digital camera of one embodiment of the present invention.

In this way, two pixel rows, among standard pixel rows (or among reference pixel rows) corresponding to a plurality of focus detection areas are determined, and correlation operation is performed between associated focus detection pixel data of these pixel rows. FIG. 4A shows correlation operation results that used focus detection pixel data of the same opening for subject A, and FIG. 4B shows correlation operation results that used focus detection pixel data of the same opening for subject B.

Figure 4B:
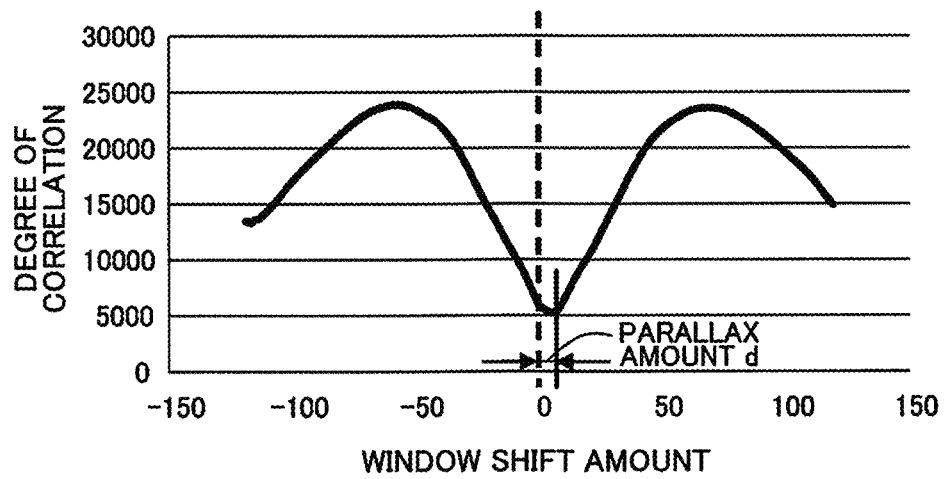

In FIG. 4A and FIG. 4B, the horizontal axis shows window shift amount, and the vertical axis shows degree of correlation F. Window shift amount represents a difference between i position of window Ws(i) of standard pixel row S, and i position of window Wr(i) of reference pixel row R, in FIG. 3. If the two windows Wr and Ws of the standard pixel row S and the reference pixel row R are at positions in the center within either row, then i=j becomes true, and window shift amount is 0. Also, the window shift amount in a case where the window Ws of standard pixel row S and the window Wr of reference pixel row R are positioned furthest apart within respective rows is 120 or −120. A window shift amount where there is a minimum peak of degree of correlation F is parallax amount. Parallax amount represents dissimilarity (degree of similarity) in a vertical direction of a subject pattern. In other words, parallax amount represents dissimilarity (degree of similarity) of a subject pattern in an arrangement direction of a pixel row and in a different direction.

In a case of a pattern that is similar in the vertical direction, such as the subject A in FIG. 1A, and corresponding pixel data in the vertical direction is substantially the same value, a minimum peak of degree of correlation F is where window shift amount is in the vicinity of 0. On the other hand, in a case of a pattern that is not similar in the vertical direction, such as the subject B in FIG. 1B, and corresponding pixel data in the vertical direction is not substantially the same value, a minimum peak of degree of correlation F constitutes a position where parallax amount d is distant from the vicinity of 0 Distant.

In this way, correlation operation is performed using focus detection pixel data of the same opening, and as a result if parallax amount is small it can be determined that the subject patterns are similar. On the other hand, if parallax amount is large it can be determined that subject patterns are different. For subject B having large parallax amount, it can be expected that there will be no improvement to focus detection precision even if pixel data is spatially added. In this type of case (when degree of similarity is low), therefore, time series addition processing is performed. Time series addition processing is the addition of associated pixel data for corresponding pixel positions of the same focus detection pixel row that has been acquired every time pixel data that has been acquired in time series at different times, that is, image data of a single frame from the image sensor, is output. In contrast, for subject A having small parallax amount (high degree of similarity), since improvement in focus detection precision is expected as a result of performing spatial addition, spatial addition is performed every time image data of a single frame is output.

Next, a case of a subject in which similar patterns and non-similar patents are mixed will be described using FIG. 5. With subject C in FIG. 5, in the vicinity of focus detection areas c1 and c2 values of respectively corresponding pixel data are substantially the same in the vertical direction (direction orthogonal to the arrangement direction of the focus detection pixel row). In this case, if correlation operation is performed using focus detection pixel data of the same opening for focus detection areas c1 and c2, parallax amount becomes small and it can be determined that degree of similarity is high, as was shown in FIG. 4A.

On the other hand, in the vicinity of focus detection areas c3, c4 and c5, respectively corresponding pixel data is at different positions. In this case, if correlation operation is performed using focus detection pixel data of the same opening for focus detection areas c2 and c3, c3 and c4, or c4 and c5, parallax amount becomes large and it can be determined that degree of similarity is low, as was shown in FIG. 4B.

As shown in FIG. 5, in a case where a similar pattern and a dissimilar pattern are mixed, focus detection pixel data of focus detection areas in a range of the similar pattern are spatially added, while for focus detection pixel data of focus detection areas in the range of the dissimilar pattern, spatial addition is not performed. Specifically, when a plurality of focus detection areas exist, the two areas for which correlation results for adjacent areas, in a range where it has been possible to determine that degree of similarity is high, are lowest are spatially added. Also, in a case where degree of similarity is high in adjacent areas a1 to a5, as in subject A (refer to FIG. 1A), all existing areas are spatially added. In this way, it is possible to improve focus detection precision by spatially adding only focus detection pixel data corresponding to a similar pattern.

Figure 6:
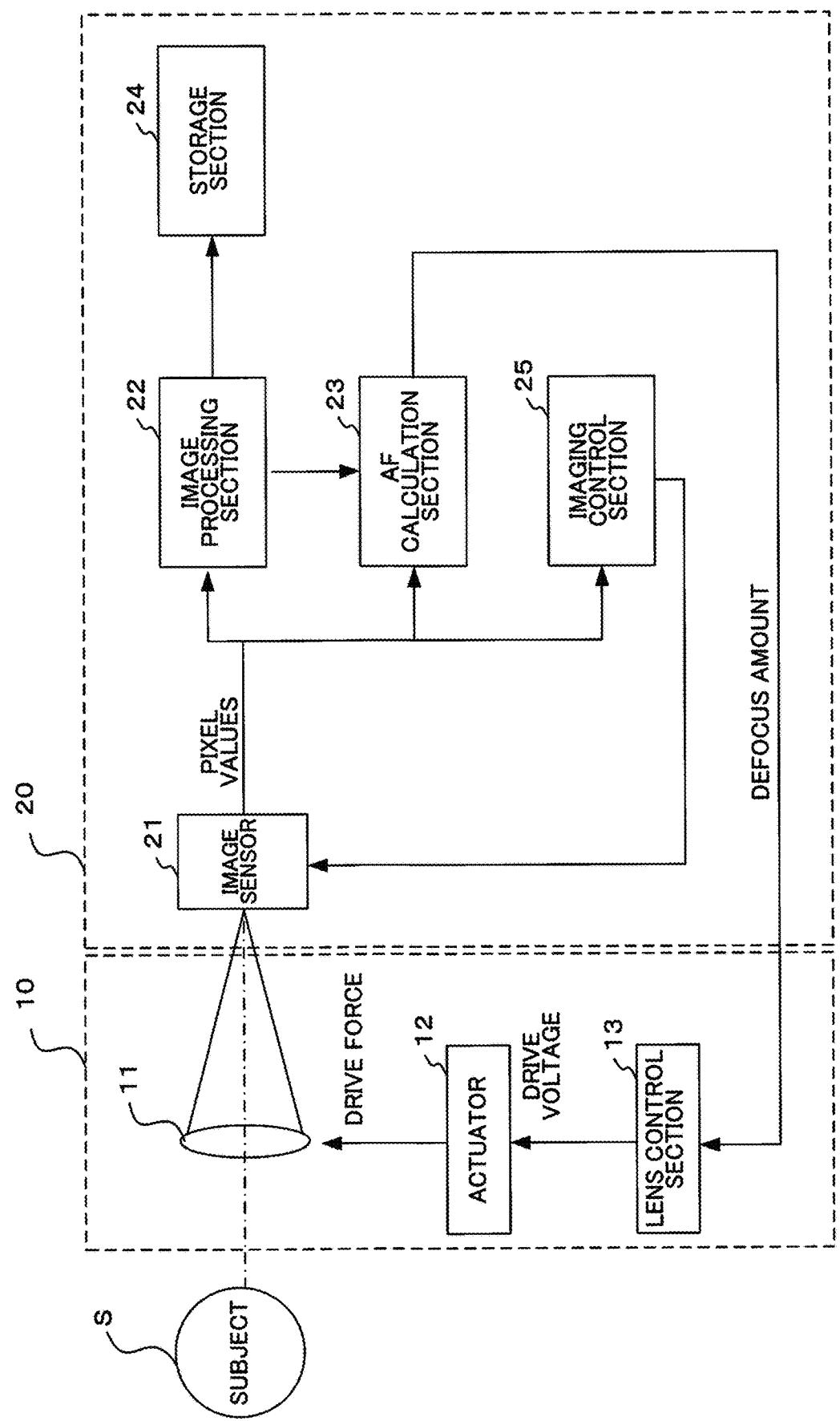
FIG. 6 is a block diagram mainly showing the electrical structure of a camera of one embodiment of the present invention.

Next, the structure of an embodiment of the present invention will be described using FIG. 6. A camera relating to this embodiment comprises an interchangeable lens 10 and a camera body 20. With this embodiment, the interchangeable lens 10 and a camera body 20 are configured separately, but they may also be constructed integrally, like a general compact camera with which a lens cannot be interchanged. Also, the camera of this embodiment divides subject light that has passed through the photographing lens in to two light fluxes using a pupil division method, and a pair of focus detection pixel groups subject each light flux to photoelectric conversion to generate image data. A phase difference is then calculated using the image data (focus detection pixel data), and a focus adjustment operation is performed based on this phase difference.

A photographing lens 11 is arranged inside the interchangeable lens 10. The photographing lens 11 is constituted by a plurality of optical lenses, including a focus lens, and forms an optical image of a subject S. Within the interchangeable lens 10 an aperture is arranged in the optical path of the photographing lens 11, and a processor is provided that has an aperture opening detection section for detecting opening of this aperture. An actuator 12 and a lens control section 13 are also provided inside the interchangeable lens 10.

A lens control section 13 has a CPU (Central Processing Unit), peripheral circuits, and a memory that stores programs etc. The lens control section 13 receives a defocus amount from an AF calculation section 23 inside the camera body 20, and performs control of the actuator 12 based on these items of information. The actuator 12 moves the focus lens within the photographing lens 11 in the optical axis direction to perform focusing. It should be noted that position of the focus lens is detected using a lens position detection section (not illustrated), and lens position is transmitted by means of a communication section (not illustrated) to the camera body 20.

An image sensor 21, image processing section 22, AF calculation section 23, and storage section 24 are provided within the camera body 20. The image sensor 21 is arranged on the optical axis of the photographing lens 11, close to a position where a subject image is formed.

The image sensor 21 is provided with a plurality of pixels, and each pixel has a photoelectric conversion section for converting the subject image (optical image) to an electrical signal. Also, the plurality of pixels are of two types, namely imaging pixels and focus detection pixels. The focus detection pixels (also called phase difference detection pixels) limit incident direction of light flux that is incident on a pixel. On the other hand, the imaging pixels do not limit light flux that is incident on the pixel as much as the focus detection pixels. These plurality of pixels are arranged two-dimensionally (refer, for example, to patent application number 2013-201568 regarding pixel arrangement). Pixels of the image sensor are arranged in a plurality of focus detection pixel rows (focus detection areas), as was described using FIG. 1A, FIG. 1B, and FIG. 5.

Light that has been incident from the photographing lens 11 is divided into two directions (pupil division), and as the previously described focus detection pixels, focus detection pixels that receive light in one of the two divided directions, and focus detection pixel that receive light in the other direction, are provided. A pair is comprised of a focus detection pixel that receives light in one direction and a focus detection pixel that receives light in the other direction. The previously described standard pixel row S is a focus detection pixel row that receives light in one direction, while the reference pixel row R is a focus detection pixel row that receives light in the other direction. The image sensor 21 functions as an image sensor having a plurality of pixel sections that subject light flux from a subject that has passed through a photographing lens to pupil division, and that are made up of pairs of pixels that respectively receive the light flux that has been subjected to pupil division, and that outputs pairs of pixel signal rows corresponding to pupil division by photoelectric conversion of the plurality of pixel sections.

Restricting incident direction of light flux that is incident on a pixel may be realized using a positional relationship between a focus detection pixel, a micro lens that is arranged in front of that focus detection pixel, and the photographing lens 11. Specifically, it is possible to restrict incident direction of light flux by shifting position of a focus detection pixel with respect to the optical axis of a micro lens. The image sensor 21 adopting this type of structure functions has an image sensor comprising a plurality of pixel sections made up of a plurality of pixels formed into pairs corresponding to a single micro lens, and that outputs a plurality of pixel signals corresponding to pupil division as a result of photoelectric conversion by the plurality of pixel sections.

The image sensor 21 outputs the pixel data (pixel values) that have been output from the focus detection pixels and the imaging pixels to the image processing section 22, AF calculation section 23, and imaging control section 25. The image processing section 22 has an image processing circuit, is input with pixel data from the imaging pixels, among the pixel data, and performs image processing for a live view display image and a storage image. The image processing section 22 also outputs image data that has been processed for storage to the storage section 24. The storage section 24 is an electrically rewritable non-volatile memory, to which image data for storage is input and stored. The image processing section 22 also detects a face of a subject using pixel data, and outputs a central coordinate position of this face, and detects organs such as eyes of the face and outputs a specified coordinate position of this organ (face detection section 22a, which will be described later). The image processing section 22 also performs subject tracking using pixel data (tracking section 22b, which will be described later).

The AF calculation section 23 has a processor, such as a CPU (Central Processing Unit), peripheral circuits and a memory that stores programs etc. The AF calculation section 23 is input with pixel data from the focus detection pixels, among pixel data, and performs AF calculation based on phase difference AF. At the time of AF calculation, a ranging area (focus detection area) corresponding to positions of the focus detection pixels is set based on central coordinate position and specified coordinate position that have been acquired from the image processing section 22, and defocus amount and contrast evaluation value are calculated for this ranging area that has been set. The focus lens within the photographing lens 11 is driven to an in focus position based on this defocus amount and contrast evaluation value that have been calculated.

The imaging control section 25 has an imaging control circuit, and performs readout control of focus detection pixel data from the focus detection pixels of the image sensor 21. The imaging control section 25 calculates subject brightness based on pixel data of the image sensor 21. The imaging control section 25 functions as a brightness detection section that detects object brightness (refer, for example, to S1 in FIG. 9).

It should be noted that the image processing section 22, AF calculation section 23 and imaging control section 25 are constituted by one or more processors. The one or more processors can realize some or all of the functions of the previously described brightness detection section. The one or more processors may also realize some or all of the functions of a phase difference calculation section, degree of correlation calculation section, frame addition section, and focus detection region setting section, which will be described later. A processor may be constructed with hardware circuits, and may be realized using software using a CPU etc.

Figure 7:
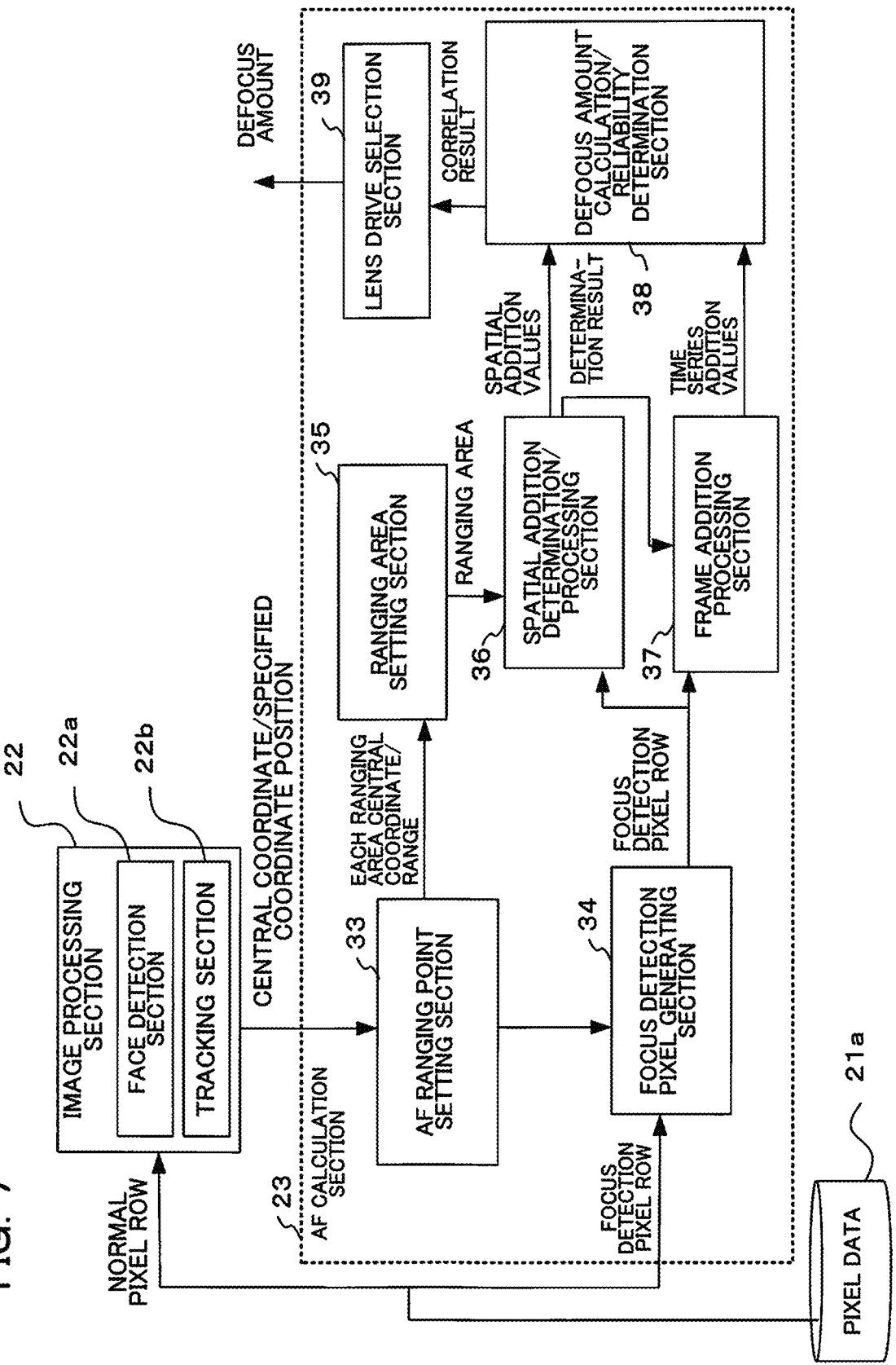
FIG. 7 is a block diagram showing detail of an AF calculation section of a camera of one embodiment of the present invention.

Next, details of the AF calculation section 23 will be described using FIG. 7. Pixel data 21a is pixel data (pixel values) that have been output from the image sensor 21, and is temporarily stored in SDRAM (Synchronous Dynamic Random Access Memory) (not illustrated) or the like.

Also, a face detection section 22a, having a face detection circuit, is provided within the image processing section 22. This face detection section 22a determines whether or not there is a face within a subject image, based on pixel data of imaging pixels from the image sensor 21. If the result of this determination is that a face is included in the subject image, the face detection section 22a detects position (central coordinate position) and size etc. of the face. Further, detection of organs such as the right ear, left ear, nose etc. is also performed, and specified coordinate position of those organs may also be detected. Central coordinates and specified coordinate positions that have been detected by the face detection section 22a are output to an AF ranging point setting section 33 within the AF calculation section 23.

A tracking section 22b having a tracking circuit is also provided within the image processing section 22. This tracking section 22b performs tracking of a subject based on pixel data of imaging pixels from the image sensor 21. The tracking section 22b compares pixel data, every time pixel data is output from the image sensor 21, for position of a face that has been detected by the face detection section 22a, and position of a subject that has been designated by the photographer, for example. Based on this comparison result, the tracking section 22b detects where the same subject has moved to within an imaging region (imaging plane), and in this way performs tracking. Central coordinate and specified coordinate positions of a tracked object that has been detected by the tracking section 22b are output to an AF ranging point setting section 33 within the AF calculation section 23.

The AF ranging point setting section 33 sets AF ranging point corresponding to central coordinate position and specified coordinate position based on the central coordinate position and specified coordinate position that have been detected by the face detection section 22a or the tracking section 22b. A plurality of ranging points are previously associated with imaging regions (imaging plane) of the image sensor 21, ranging points that are close to the central coordinate position and specified coordinate position are set from among the plurality of ranging points, and a central coordinate of each ranging point that has been set is output to a ranging area setting section 35 and a focus detection pixel generating section 34. It should be noted that ranging points can also be set manually by the user.

The ranging area setting section 35 is input with ranging points that have been set by the AF ranging point setting section 33, and sets a ranging (focus detection) area as a central coordinate of each ranging area. The ranging area setting section 35 then outputs information such as coordinates representing range of a ranging area to a spatial addition determination/processing section 36. The ranging area setting section 35 functions as a focus detection region setting section that sets a focus detection region (refer, for example, to FIG. 1A, FIG. 1B and FIG. 5).

The focus detection pixel generating section 34 is input with focus detection pixel data of focus detection pixel rows, among the pixel data 21a. Also, the focus detection pixel generating section 34 is input with central coordinate of a ranging (focus detection) area etc. from the AF ranging point setting section 33, and generates a row of focus detection pixel data that is close to the AF ranging point that has been set from among the focus detection pixel data. This focus detection pixel data that has been generated is output to the spatial addition determination/processing section 36 and the frame addition processing section 37.

The spatial addition determination/processing section 36 has a correlation operation circuit, and performs a correlation operation using focus detection pixel data for the same opening, among focus detection pixel data that has been input from the focus detection pixel generating section 34.

A parallax amount is obtained from this correlation operation (refer to FIG. 4A and FIG. 4B), and whether to execute spatial addition or time series addition for the focus detection pixel data is determined based on the parallax amount. As was described using FIG. 1A to FIG. 5, if the parallax amount is small it can be determined that subject pattern is similar, and spatial addition is performed. On the other hand, if parallax amount is large it can be determined that subject patterns are different and time series addition is performed. This determination result is output to the frame addition processing section 37. It should be noted that the spatial addition determination/processing section 36 performs spatial addition determination for a focus detection area within a ranging area that has been set by the ranging area setting section 35.

The spatial addition determination/processing section 36 functions as a degree of correlation (degree of similarity) calculation section that calculates degree of correlation (degree of similarity) between pixel signal rows that are made up of pixel signals of a plurality of pixels corresponding to at least one pair, and are positioned in a different direction to the pupil division direction. The degree of correlation calculation section calculates degree of correlation (degree of similarity) for a combination of a plurality of pixel signal rows (refer, for example, to FIG. 5). The degree of correlation calculation section calculates degree of correlation (degree of similarity) using pixel signal rows that are contained in a focus detection region that has been set.

The spatial addition determination/processing section 36 also has an addition circuit, and performs spatial addition in the event that it has been determined to perform spatial addition. Spatial addition is respective addition, for two focus detection pixel rows, of associated focus detection pixel data positioned in a different direction to the arrangement direction of focus detection pixel rows (direction orthogonal to the arrangement direction in the examples of FIG. 1A and FIG. 1B), and this addition is performed for all pixels of the focus detection pixel rows.

For example, in focus detection area (focus detection pixel row) a1, the spatial addition makes pixel data at position x[1] in an x direction on the imaging surface a1$x$[1], make pixel data at position x[2] a1$x$[2], . . . . Similarly, in focus detection area (focus detection pixel row) a2, pixel data at position x[1] on the imaging surface is made a2$x$[1], pixel data at position x[2] is made a2$x$[2], . . . . Values of pixel data are similarly determined in focus detection areas (focus detection pixel rows) a3, a4 and a5 also. In this case, focal point pixel data that has been subjected to spatial addition added becomes (a1$x$[1]+a2$x$[1]+a3$x$[1]+a4$x$[1]) at position x[1], and becomes (a1$x$[2]+a2$x$[2]+a3$x$[2]+a4$x$[2]) at position x[2]. Subsequently, for position x[3] and after also, at corresponding positions respective focus detection pixel data for focus detection pixel rows a1 to a5 are added It should be noted that as was described using FIG. 5, focus detection areas of low degree of similarity may be excluded from being subjected to spatial addition. The spatial addition determination/processing section 36 outputs spatial addition values that have been calculated to the defocus amount calculation/reliability determination section 38.

The frame addition processing section 37 has an addition circuit that adds focus detection pixel data for every frame. The frame addition processing section 37 performs time series addition in the event that the spatial addition determination/processing section 36 has determined that time series addition will be performed without performing spatial addition. Specifically, the frame addition processing section 37 is input with focus detection pixel data that has been output from the focus detection pixel generating section 34. The frame addition processing section 37 then outputs focus detection pixel data to the defocus amount calculation/reliability determination section 38 after performing frame addition processing or without performing frame addition processing. The frame addition processing section 37 functions as a frame addition section that acquires pixel signal rows for different times using the image sensor, adds a plurality of pixel signal rows that have been acquired for every pixel, and generates a time series addition pixel signal (refer, for example, to S7 in FIG. 9).

The defocus amount calculation/reliability determination section 38 is input with spatial addition values from the spatial addition determination/processing section 36 and time series addition values from the frame addition processing section 37, calculates a phase difference for focus detection pixel data using either output, and obtains a defocus amount based on this phase difference. Since calculation of this phase difference and defocus amount is a known method, detailed description is omitted.

The spatial addition determination/processing section 36 and the defocus amount calculation section/reliability determination section 38 function as a phase difference calculation section that, if degree of correlation (degree of similarity) is larger than a specified value, adds pairs of pixel signals of pixel signal rows in a direction that is different to a pupil division direction, for each of the respective pairs, to generate a spatial addition pixel signal, and performs phase difference detection based on this spatial addition pixel signal that has been generated (refer, for example, to S9 and S11 in FIG. 9). The frame addition processing section 37 and defocus amount calculation/reliability determination section 38 function as a phase difference calculation section, and this phase difference calculation section performs phase difference detection based on a time series addition pixel signal if degree of correlation (degree of similarity) is smaller than a specified value (for example, S7 and S11 in FIG. 9). The phase difference calculation section calculates degree of correlation (degree of similarity) using the degree of correlation calculation section if it is determined that subject brightness is lower than a specified brightness (refer, for example, to S1 Yes and S3 in FIG. 9). The phase difference calculation section extracts a plurality of pixel signal rows exhibiting a degree of correlation (degree of similarity) larger than a specified value, generates a spatial addition pixel signal using pixel signals included in a range of these pixel signal rows that have been extracted, and performs phase difference detection based on this addition pixel signal that has been generated (refer, for example, to FIG. 5). The phase difference calculation section performs phase difference detection in a focus detection region, in the event that at least one degree of correlation (degree of similarity) that has been calculated by the degree of correlation calculation section in accordance with the focus detection region is higher than a specified value (refer, for example, to FIG. 5).

Figure 8:
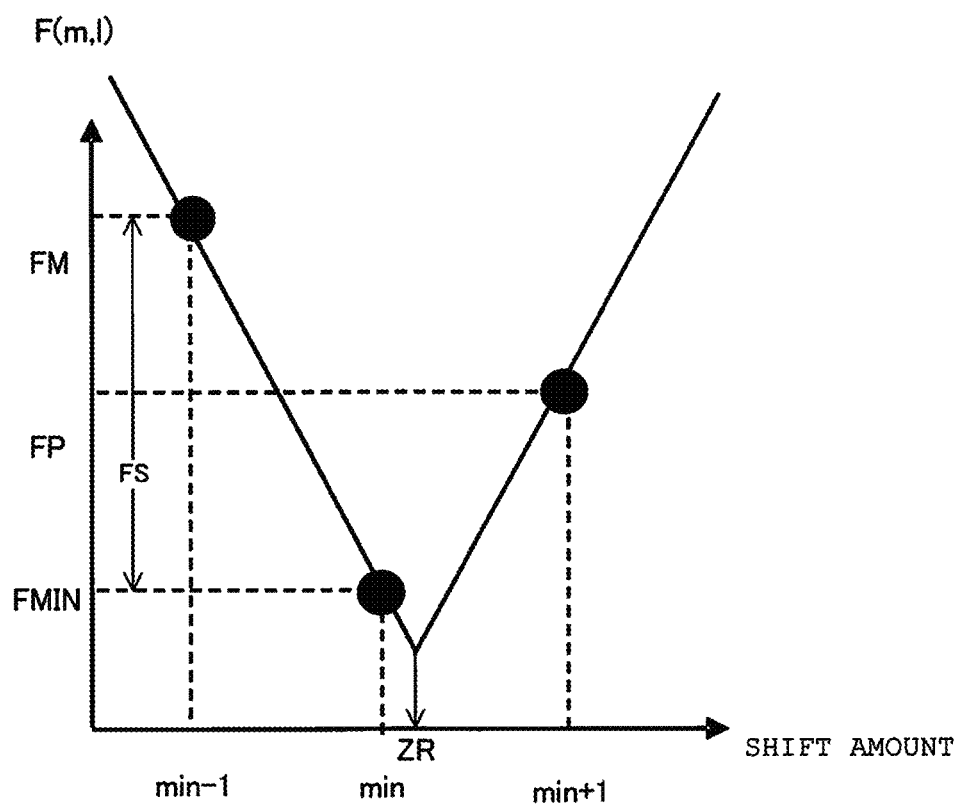
FIG. 8 is a graph showing correlation operation results, and reliability, in the camera of one embodiment of the present invention.

Also, the defocus amount calculation/reliability determination section 38 determines reliability of the defocus amount that has been calculated. Determination of reliability of defocus amount will be described using FIG. 8. FIG. 8 is a graph showing phase position (shift amount) for a pair of focus detection pixel data rows close to where a correlation evaluation value F(m,1) becomes a minimum value, and correlation evaluation value F(m,1). In this graph, for a shift amount of min, correlation evaluation value F(m,1) becomes a minimum. Here, since correlation evaluation value F(m,1)

is discrete data, interpolation processing is carried out using a plurality of items of correlation evaluation value F(m,1) in the vicinity of the minimum value, and shift amount ZR corresponding to a true minimum value is calculated. If shift amount ZR is obtained, shift amount ZR is multiplied by a specified coefficient to calculate defocus amount.

The defocus amount calculating section/reliability determination section 38 uses degree of correlation inclination Fs of the correlation evaluation value F(m,1) as a phase difference AF reliability evaluation value. Specifically, in the example shown in FIG. 8, an inclination Fs[k] of a straight line passing through minimum value (FMIN) of correlation evaluation value F(m,1) and correlation evaluation value FM that is the larger of FM and FP, which are two values of F(m,1) either side of this minimum value FMIN, is made a reliability evaluation value that represents reliability. If this reliability evaluation value is lower than a specified value, it is determined that focus detection is not possible.

A lens drive selection section 39 selects a drive method and drive direction for the photographing lens 11 based on correlation results that have been output from the defocus amount calculation/reliability determination section 38 (defocus amount and defocus direction that have been obtained from results of the correlation operation), and outputs to the lens control section 13. As was described previously the lens control section 13 drives the photographing lens 11 to an in focus position based on defocus amount from the AF calculation section 23.

Next, AF operation of this embodiment will be described using the flowchart shown in FIG. 9. This flow is executed by the CPU etc. that is provided within the AF calculation section 23 controlling each section shown in FIG. 6 and FIG. 7 based on programs that have been stored in non-volatile memory.

If a shooting preparation operation (release button) is pressed down half way (1st release)) is performed, operation in accordance with the flow for AF shown in FIG. 9 is commenced. It is first determined whether or not there is low brightness and an under exposure state (S1). Here, the imaging control section 25 calculated subject brightness value based on pixel data from the image sensor 21, and determines that there is no brightness and underexposure if this subject brightness value is darker than a specified brightness value. If the result of this determination is not an underexposure state, processing advances to the ranging computation of step S11.

If the result of determination in step S1 is low brightness and an underexposure state, a correlation operation is executed with associated pixel data for the same opening of a specified area (S3). Here, the spatial addition determination/processing section 36 performs a correlation operation between focus detection pixel data rows of the same opening within a specified plurality of areas, as was described previously.

Once the correlation operation has been performed, it is next determined whether or not degree of similarity is high (S5). Here, the spatial addition determination/processing section 36 obtains parallax amount from the correlation operation results (refer to FIG. 4A and FIG. 4B), and determines whether or not degree of similarity is high based on the parallax amount. As was described using FIG. 1A to FIG. 5, if parallax amount is small it is possible to determine that the subject patterns are similar, while if parallax amount is large it is possible to determine that the subject patterns are different.

If the result of determination in step S5 is that degree of similarity is high, focus detection pixel data is spatially added (S9). Here it is a case where it has been determined that degree of similarity of subject patterns is high, and the spatial addition determination/processing section 36 performs spatial addition for focus detection pixel data that has been output from the focus detection pixel generating section 34.

On the other hand, if the result of determination in step S5 is that degree of similarity is not high, pixel data is added in time series (S7). Here, the frame addition processing section 37 adds focus detection pixel data every time focus detection pixel data is output from the image sensor 21 (for every frame). As was described previously, if degree of similarity is low, there will be no improvement in focus detection precision even if spatial addition is performed, and so addition processing is performed among associated corresponding focus detection pixel data every time image data of one frame is output. As a result of this processing, contrast of a focus detection pixel row after addition becomes high, and it is possible to improve focus detection precision.

If focus detection pixel data has been added in step S7 or S9, next, ranging computation is performed (S11). Here, the defocus amount calculation section/reliability determination section 38 performs a correlation operation using focus detection pixel data that has been input from the spatial addition determination/processing section 36 or the frame addition processing section 37, and calculates defocus amount. Once ranging computation has been performed in step S11, the flow for AF operation is terminated. In a case where a shooting preparation operation (1st release button is continuously pressed down) is in progress, the flow for AF operation is executed again repeatedly from step S1. If the Shooting preparation operation (1st release button being pressed down) is not being performed (finger has been taken off), then once the shooting preparation operation (operation of 1st release button) is performed again, processing is performed from step S1.

As was described previously, with one embodiment of the present invention, if time series addition is performed for a subject that is moving or a subject that has different patterns, it is likely that an error will arise in focus detection results. Focus detection is therefore performed by divided use of the spatial integration section (refer, for example, to the spatial addition determination/processing section 36) and the time series addition section (refer, for example, to the frame addition processing section 37 in accordance with conditions, and focus detection precision is raised.

Also, with the one embodiment of the present invention, in the case of an underexposure state under low brightness conditions (refer to S1 Yes in FIG. 9), a correlation operation is performed for associated pixel data of the same opening, among each of the focus detection pixel data that has been spatially added (refer, for example, to FIG. 4A, FIG. 4B, and S3 in FIG. 9). If the result of this correlation operation is a value that is close to being within a specified range, subject patterns are similar, and images on a plurality of focus detection pixel rows are determined to be the same subject (refer, for example, to FIG. 1A, FIG. 4A, and S5 in FIG. 9). In this case, spatial additional processing of pixel data is performed (refer, for example, to S9 in FIG. 9). Spatial addition processing can be executed in a short time at the point in time that image data for a single frame has been acquired. Also, as a result of performing addition processing contrast of the focus detection pixel data becomes large, and focus detection precision is improved.

Also, with the one embodiment of the present invention, if a correlation operation result for associated pixels of the same opening is a value outside of a specified range, the subject patterns are not similar, and images on the plurality of focus detection pixel rows are determined to be for different subjects (refer, for example, to FIG. 1B, FIG. 4B, and S5 No in FIG. 9). In this case, spatial addition of pixel data is not performed and frame addition processing is applied in time series (refer, for example, to S7 in FIG. 9).

Also, with the one embodiment of the present invention, a degree of correlation (degree of similarity) is calculated between pixel signal rows that are positioned in a different direction to the pupil division direct, and are constituted by pixel signals of a plurality of pixels corresponding to at least one pair (refer, for example, to S3 in FIG. 9). Then, if degree of correlation (degree of similarity) is larger than a specified value (refer, for example, to S5 Yes in FIG. 9), a pair of pixel signals of a pixel signal row are calculated in a direction that is different to the pupil division direction for each respective pair, to generate a spatial addition pixel signal (refer, for example, to S9 in FIG. 9). Phase difference detection is performed based on this spatial addition pixel signal that has been generated (refer, for example, to S11 in FIG. 9). As a result it is possible to prevent deterioration in ranging precision even when there are different subject patterns.

It should be noted that with the one embodiment of the present invention so-called phase difference AF, where phase difference AF detection pixels arranged on an image sensor 21, is adopted for the purpose of phase difference AF detection. However, this is not limiting and a phase difference detection section may be provided separately to the image sensor 21.

Also, with the one embodiment of the present invention, the face detection section 22a and tracking section 22b within the image processing section 22 respectively have a face detection circuit and a tracking circuit, but instead of hardware circuits they may also be configured as software using a CPU and programs, may be implemented by hardware circuits such as gate circuits that are generated based on a programming language described using Verilog, or may also be configured using a DSP (Digital Signal Processor). Suitable combinations of these approaches may also be used. Also, without being limited to a CPU, processes of each of the above described sections may be performed by one or more processors constructed as hardware, as long as there are elements providing functions as a controller. For example, each section may be a processor that is constructed as respective electronic circuits, and may be each circuit section of a processor that is constructed with integrated circuits such as an FPGA (Field Programmable Gate Array). Also, a processor that is constructed of one or more CPUs may execute the functions of each section, by reading out and executing computer programs that have been stored in a storage medium.

Also, regarding each of the sections with the AF calculation section 23, besides being constructed in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used. Calculation of defocus amount, evaluation of reliability, calculation of contrast evaluation values, and generation of phase difference pixels etc. has been performed by repeating uniform calculation processing, but these operations may also be configured using hardware circuits. Also, without being limited to a CPU, processes of each of the above-described sections may be performed by one or more processors constructed as hardware, as long as there are elements providing functions as a controller. For example, each section may be a processor that is constructed as respective electronic circuits, and may be each circuit section of a processor that is constructed with integrated circuits such as an FPGA (Field Programmable Gate Array). Also, a processor that is constructed of one or more CPUs may execute the functions of each section, by reading out and executing computer programs that have been stored in a storage medium.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to adopt the present invention as long it is a focus detection device that performs focus detection using phase difference AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus detection device, comprising
   an image sensor having a plurality of pixel sections that subject light flux from a subject that has passed through a photographing lens to pupil division and that are made up of pairs of pixels that respectively receive the light flux that has been subjected to pupil division, and that outputs pairs of pixel signal rows corresponding to pupil division by photoelectric conversion of the plurality of pixel sections, and one or more processors constructed as hardware, wherein the one or more processors calculate degree of similarity between pixel signal rows that are positioned in a direction that is different to the pupil division direction, and that are constituted by pixel signals of a plurality of pixels corresponding to at least one of the pairs, and if the degree of similarity is higher that a specified value, generate a spatial addition pixel signal by adding the pairs of pixel signals of the pixel signal row in a direction that is different to the pupil division direction, for each respective pair, and perform phase difference detection based on this spatial addition pixel signal that has been generated.

2. The focus detection device of claim 1, wherein:

the one or more processors acquire pixel signal rows at different times using the image sensor, add the plurality of pixel signal rows that have been acquired for every pixel, and generate a time series addition pixel signal; and if the degree of similarity is lower than a specified value, perform phase difference detection based on the time series addition pixel signal.

3. The focus detection device of claim 1, wherein:

the one or more processors detect subject brightness; and calculate degree of similarity if the subject brightness is determined to be lower than a specified brightness.

4. The focus detection device of claim 1, wherein:

the one or more processors calculate degree of similarity for a combination of a plurality of the pixel signal rows; and extract a plurality of the pixel signal rows exhibiting a degree of similarity larger than the specified value, generate a spatial addition pixel signal using pixel signals included in a range of these pixel signal rows that have been extracted, and perform phase difference detection based on this addition pixel signal that has been generated.

5. The focus detection device of claim 1, wherein:

the one or more processors set a focus detection region; and calculate degree of similarity using the pixel signals rows that are included in the focus detection region that has been set.

6. The focus detection device of claim 5, wherein:

the one or more processors perform phase difference detection in the focus detection region in the event that at least one of degree of similarity that has been calculated in accordance with the focus detection region is higher than the specified value.

7. A focus detection method for an imaging device having an image sensor comprising a plurality of pixel sections that subject light flux from a subject that has passed through a photographing lens to pupil division and that are made up of pairs of pixels that respectively receive the light flux that has been subjected to pupil division, and that outputs pairs of pixel signal rows corresponding to pupil division by photoelectric conversion of the plurality of pixel sections, the focus detection method comprising:

calculating degree of similarity between pixel signal rows that are positioned in a direction that is different to the pupil division direction, and that are constituted by pixel signals of a plurality of pixels corresponding to at least one of the pairs; and if the degree of similarity is higher that a specified value, generating a spatial addition pixel signal by adding the pairs of pixel signals of the pixel signal row in a direction that is different to the pupil division direction, for each respective pair, and performing phase difference detection based on this spatial addition pixel signal that has been generated.

8. The focus detection method of claim 7, further comprising:

acquiring pixel signal rows at different times using the image sensor, adding the plurality of pixel signal rows that have been acquired for every pixel, and generating a time series addition pixel signal; and if the degree of similarity is lower than a specified value, performing phase difference detection based on the time series addition pixel signal.

9. The focus detection method of claim 7, further comprising:

detecting subject brightness; and calculating degree of similarity if the subject brightness is determined to be lower than a specified brightness.

10. The focus detection method of claim 7, further comprising:

calculating degree of similarity for a combination of a plurality of the pixel signal rows; and extracting a plurality of the pixel signal rows exhibiting a degree of similarity larger than the specified value, generating a spatial addition pixel signal using pixel signals included in a range of these pixel signal rows that have been extracted, and performing phase difference detection based on this addition pixel signal that has been generated.

11. The focus detection method of claim 7, further comprising:

setting a focus detection region; and calculating degree of similarity using the pixel signals rows that are included in the focus detection region that has been set.

12. The focus detection method of claim 11, further comprising:

performing phase difference detection in the focus detection region in the event that at least one of degree of similarity that has been calculated in accordance with the focus detection region is higher than the specified value.

* * * * *